US011890773B2

(12) United States Patent
Koch et al.

(10) Patent No.: US 11,890,773 B2
(45) Date of Patent: Feb. 6, 2024

(54) KNIFE, IN PARTICULAR FOR SLICERS

(71) Applicant: MULTIVAC SEPP HAGGENMUELLER SE & CO. KG, Wolfertschwenden (DE)

(72) Inventors: Dominic Koch, Biedenkopf (DE); Oliver Mueller, Steffenberg (DE)

(73) Assignee: Multivac Sepp Haggenmueller SE & Co., KG, Wolfertschwenden (DE)

(*) Notice: Subject to any disclaimer, the term of this patent is extended or adjusted under 35 U.S.C. 154(b) by 0 days.

(21) Appl. No.: 16/890,636

(22) Filed: Jun. 2, 2020

(65) Prior Publication Data

US 2020/0376703 A1 Dec. 3, 2020

(30) Foreign Application Priority Data

Jun. 3, 2019 (DE) ......................... 102019114846.4

(51) Int. Cl.

| | |
|---|---|
| ***B26D 7/32*** | (2006.01) |
| ***B26D 3/28*** | (2006.01) |
| ***B26D 7/06*** | (2006.01) |

(52) U.S. Cl.

CPC ............... *B26D 7/32* (2013.01); *B26D 3/283* (2013.01); *B26D 7/0608* (2013.01); *B26D 2003/285* (2013.01); *B26D 2210/02* (2013.01)

(58) Field of Classification Search

CPC .......... B26D 1/0006; B26D 2001/0053; B26D 2210/02; B26D 7/32; B26D 3/283; B26D 7/0608; B26D 2003/285; B26D 2001/0046; B26D 1/26; B26D 1/28; B26D 2001/006; B26D 7/18; Y10T 83/04; Y10T 83/9372; Y10T 83/9394; Y10T 83/9403

See application file for complete search history.

(56) References Cited

U.S. PATENT DOCUMENTS

| | | | | | |
|---|---|---|---|---|---|
| 2,472,876 | A * | 6/1949 | Ahrndt | B26D 1/0006 | 83/676 |
| 3,532,021 | A * | 10/1970 | Beckner | B26D 1/0006 | 83/679 |
| 5,213,020 | A * | 5/1993 | Pleau | B23D 47/005 | 83/828 |
| 5,988,033 | A * | 11/1999 | Skaar | B26D 7/01 | 83/342 |

(Continued)

FOREIGN PATENT DOCUMENTS

| | | |
|---|---|---|
| DE | 10 2004 016 615 A1 | 10/2005 |
| DE | 10 2011 103 462 A1 | 12/2012 |

(Continued)

OTHER PUBLICATIONS

German Search Report dated May 8, 2020, Application No. 10 2019 114 846.4, Applicant MULTIVAC Sepp Haggenmueller SE & Co. KG, 5 Pages.

(Continued)

*Primary Examiner* — Jonathan G Riley

(74) *Attorney, Agent, or Firm* — Brooks Kushman P.C.

(57) ABSTRACT

In order to prevent slices separated from a product caliber by a slicer from adhering temporarily to a cutting surface of a blade and not coming to rest on the desired position on a base when the slices are ejected, the arrangement of one or more recesses in the blade back facing away from the product caliber is suggested in a specific way.

21 Claims, 7 Drawing Sheets

(56) References Cited

U.S. PATENT DOCUMENTS

| | | | | |
|---|---|---|---|---|
| 2004/0000060 | A1* | 1/2004 | Zhu | B26D 1/0006 30/350 |
| 2006/0021487 | A1* | 2/2006 | Dickover | B26D 1/0006 83/835 |
| 2012/0174722 | A1* | 7/2012 | Weber | B26D 1/0006 83/401 |
| 2013/0291698 | A1* | 11/2013 | Lotz | B26D 7/08 83/105 |
| 2015/0135926 | A1* | 5/2015 | Weber | B26D 1/0006 83/672 |
| 2015/0158194 | A1* | 6/2015 | Krauss | B26D 1/0006 83/13 |
| 2015/0328793 | A1 | 11/2015 | Mueller | |
| 2019/0299479 | A1* | 10/2019 | Supe-Dienes | B26D 1/141 |
| 2019/0315010 | A1* | 10/2019 | Scattolin | B26D 1/0006 |

FOREIGN PATENT DOCUMENTS

| | | | | |
|---|---|---|---|---|
| DE | 102011103462 | A1 * | 12/2012 | B26D 1/0006 |
| DE | 10 2012 007250 | A1 | 10/2013 | |
| DE | 10 2016 005 443 | A1 | 11/2017 | |
| DE | 10 2016 108 274 | A1 | 11/2017 | |
| DE | 102016005443 | A1 * | 11/2017 | |
| DE | 102016108274 | A1 * | 11/2017 | |
| EP | 0709170 | A1 * | 5/1996 | |
| EP | 1582318 | A1 * | 10/2005 | B26D 1/0006 |
| EP | 2799193 | A1 * | 11/2014 | B26D 1/0006 |
| EP | 2 948 279 | B1 | 10/2017 | |
| WO | 2014/079575 | A1 | 5/2014 | |
| WO | 2014/177711 | A1 | 11/2014 | |

OTHER PUBLICATIONS

European Search Report dated Nov. 9, 2020 (with Partial English Machine Translation), Application No. 20176713.4-1016, Applicant MULTIVAC Sepp Haggenmueller SE & Co. KG, 7 Pages.

* cited by examiner

KNIFE, IN PARTICULAR FOR SLICERS

CROSS-REFERENCE TO RELATED APPLICATIONS

This application claims priority to German Patent Application No. DE 102019114846.4 filed on Jun. 3, 2019, the disclosure of which is incorporated in its entirety by reference herein.

TECHNICAL FIELD

The invention relates to blades, in particular rotating blades, in particular rotating sickle blades, such as those used in slicers for slicing sausage, cheese or other stringy, elastic food products.

BACKGROUND

The problem here is that the thin and very elastic slices temporarily stick to the back of the blade facing the disk during the cutting process and thus, in the cutoff state and when dropped onto a support, do not lie flat but form waves or folds or do not come to rest on the support at the desired position.

In order to avoid this, it is known from EP 2948279 B1, for example, that the cutting angle of the cutting edge can be varied in the circumferential direction of the blade.

The disadvantage of this solution is that it is costly to reproduce this circumferentially changing cutting angle when regrinding the blade.

SUMMARY

It is therefore the object according to the invention to provide a better solution to prevent the sticking of slices to the back of the blade in the form of an improved blade and a mode of operation of this blade in a cutting device.

A cutting device such as a slicer, which cuts strand-shaped elastic products such as sausage or cheese, so-called calibers, into slices at high speed, usually has a base frame to which, on the one hand, a product receipt is attached, on which the product to be sliced or the strand of product is fed to the cutting point, and, on the other hand, a rotating blade, which successively cuts slices from the strand at the cutting point.

The blade could also be a non-rotating blade, for example one that oscillates in an arc-shaped movement or a linear movement.

The blade is, especially with slicers used today, usually a rotating blade, usually a so-called sickle blade, which, however, in contrast to a sickle, has the cutting edge not on the concave inner contour but on the convex outer contour, which is the front edge of the blade body due to the direction of rotation of the sickle blade. In one direction of this cutting edge, the so-called cutting direction, the cutting edge has a steadily increasing, in particular continuously increasing, distance to the axis of rotation, which can also have the shape of a geometric spiral around the axis of rotation of the sickle blade.

This has the advantage that the axis of rotation of such a sickle-shaped blade can remain stationary during the cutting operation.

If, on the other hand, the blade is circular disc-shaped with an annularly closed, in particular circularly closed, endless cutting edge on the outer circumference, the axis of rotation of the blade must be moved, in particular oscillated back and forth, in cutting operation for cutting off slices.

Irrespective of this, the familiar blades are plate-shaped and have a cross-section which, on one side, the rear side of the blade, is curved outwards from the cutting plane defined by the cutting edge, while the blade on the blade front side—which in the cutting device faces the product receipt, i.e. the strand of product lying on top of it—generally does not project beyond the cutting plane.

The cutting edge is formed in cross-section through the basic body of the blade by a front cutting surface, which may be flat, for example, but may also have a front recess, e.g. radially set back from the cutting edge, and a rear cutting surface, the two cutting surfaces running at an acute cutting angle to each other.

The inner end of the cutting surface facing away from the cutting edge is adjoined by a pressing surface, which is also part of the curved back of the blade, but which extends to the cutting plane at a pressing angle which is smaller than the cutting angle.

The inner end of the pressing surface facing away from the cutting edge is adjoined by the remaining, usually flat, rear side of the plate-shaped blade, which in this central area generally has a uniform thickness, apart from the front recess which may be present on the blade front side.

According to the invention, at least one recess is arranged in the curved back of such a blade in order to minimize the adhesion of the slice being cut off to the back of the blade, in particular its pressing surface.

This at least one recess is adapted to the characteristics of the product and may also depend on various parameters of the cutting device in which this blade is used, such as the material and roughness of the outer sides of the blade, the cutting speed and other parameters.

One way of adapting to such parameters is to vary the size and/or shape of the cross-sectional area of the recess lying transversely, in particular perpendicularly, to the cutting plane and/or transversely, in particular perpendicularly, to the direction of the cutting edge in the direction of the cutting edge, in particular in the case of a sickle-shaped blade.

Another possibility is to vary the position, especially the radial distance, of the recess to the cutting edge in the direction of the cutting edge.

According to the invention, these two possibilities can also be combined.

The advantage of these solutions is that the cutting angle can be kept constant, not only along the direction of the cutting edge over the entire length of the cutting edge, but also over a number of different products with similar material properties to be cut. Above all, this makes regrinding these knives much easier, since the recesses to be made only have to be made once, when the blade is manufactured, and do not have to be changed every time the blade is reground.

This is possible because the width of the cutting surface is anyway only about 0.5 mm to 2 mm—depending on the state of wear—while the pressing surface in this direction is at least 10 times, possibly even at least 15 times as wide.

Usually the cutting angle is in the order of 30°, while the pressing angle is only about 20°.

When designing and positioning the at least one recess, one parameter to be taken into account is the high speed of such knives in so-called slicers, which is at least 500 rpm, which, in the case of a sickle-shaped blade with a maximum radius of, for example, 50 cm, results in a very considerable penetration speed of the cutting edge into the product.

Preferably, the at least one recess is a groove which extends with its main direction of extension, i.e. primarily, along the direction of the cutting edge, but preferably at a distance from it. Preferably, the bottom of the groove has a uniform curvature transverse to its main direction of extension, so that the groove can be easily produced by grinding with a round grinding wheel.

Because regardless of the design of the at least one recess in the top view of this recess, it is usually located in the pressing surface and in particular only in the pressing surface.

In exceptional cases, it may not be completely within the pressing surface, but may extend from there into the adjacent area of the back of the blade, i.e. away from the cutting edge.

However, the recess extends towards the cutting edge, preferably at most to the transition of the pressing surface into the cutting surface, i.e. the rear cutting surface, which is formed on the rear side of the blade. Thus, the recess does not change by regrinding the cutting surface, especially if, when the blade is new, there is a distance between the cutting surface and the recess of at least 1 mm, preferably at least 2 mm.

Depending on the elasticity of the slice to be cut off or already completely cut off, the slice will not adhere to the back of the blade over its entire surface due to the recess, but will at most still adhere to the pressing surface in the areas away from the recess. However, due to the high rotational speed, there will still be sufficient pressure effect by means of the pressing surface on the slice in the direction away from the cutting plane.

This prevents the slice from touching the bottom or the flanks of the recess, as may still occur at very low speeds of movement, especially rotational speeds, of the blade.

In one type of execution, the at least one recess, in particular in the form as a groove, can also extend only along a part of the extent of the cutting edge parallel to the latter, wherein in the case of a finite cutting edge there is preferably no recess in the initial region and end region along the extent of the cutting edge.

The size, in particular the width, measured transversely to the direction in which the cutting edge extends, and/or the shape considered in plan view of the cutting plane and/or the cross-sectional shape and/or the radial position of the recess relative to the axis of rotation may be constant in the direction in which the cutting edge extends, in particular in the case of circular slice-shaped knives.

In the case of a finite cutting edge, i.e. in particular with sickle-shaped knives, these parameters can change along the direction of the cutting edge, and in particular increase or decrease continuously along the direction of the cutting edge. If several recesses are arranged one behind the other in the direction of the cutting edge, they can each have an identical design, especially in the case of a circular disc-shaped blade. In a finite cutting edge, such as a sickle-shaped blade, on the other hand, the depressions are preferably of different shapes, with design parameters of the depressions preferably increasing or decreasing continuously in one direction along the direction of extension of the cutting edge.

By varying the parameters of one or more recesses, it is possible—especially in the case of a non-circular disc-shaped blade—to take into account the changing of the angle of entry of the cutting edge into the product as well as the changing of the cutting speed, i.e. the relative speed between the blade and the product at a point on the cutting edge that is located in the product.

As a rule, the thickness of the basic body of the blade is maximum 15 mm, better maximum 12 mm, better maximum 8 mm.

In particular, starting from this value, the maximum depth of the cavity should not exceed 2 mm, better 1 mm, better 0.5 mm, better 0.3 mm.

In relation to the thickness of the blade at the radially inner end of the pressing surface facing away from the cutting edge, the depth of the recess should be a maximum of 20%, better a maximum of 10%, better a maximum of 5%.

These absolute or relative values have proven to be particularly suitable in practice.

Also the clearance angle, between, in a cross-section through the recess, the flank of the recess facing the cutting edge extends and the rear side of the blade immediately adjacent to the edge of the recess, can be constant along the direction of the cutting edge—in particular in the case of circular disc-shaped blades—in the case of a single recess or in the case of each recess, and in the case of several recesses can also be the same over the number of recesses.

In the case of a finite cutting edge, such as a sickle blade in particular, this value can steadily increase or decrease along the direction of the cutting edge, preferably continuously.

In the case of a sickle-shaped blade, this in turn means that it can be adapted to the different geometric parameters depending on the rotational position of the sickle blade in relation to the strand of the product.

When viewed from above onto the pressing surface, the at least one recess should reach the cutting surface over at least a part of its extension in order to avoid the pressing surface running continuously along the cutting surface in the direction of the cutting edge, which would favour the start of adhesion of the slice.

The width of the recess measured perpendicular to the cutting edge along the back side of the blade should be at least 30%, better at least 50%, better at least 70% of the width of the pressing surface in this direction to achieve a sufficient effect.

With regard to the use of such a cutting blade in a slicer, the desired effect occurs to a sufficient extent in the design of the recesses in the back of the blade according to the invention, preferably when the speed of the cutting blade is at least 500 rpm, better at least 700 rpm, better at least 1000 rpm, better at least 1200 rpm.

However, an upper limit of no more than 5000 rpm, better no more than 3000 rpm, better no more than 2500 rpm, of the cutting blade should not be exceeded.

BRIEF DESCRIPTION OF THE DRAWINGS

Types of embodiments according to the invention are described in more detail below as examples, with reference to the following drawings which show.

DETAILED DESCRIPTION

Figure 1A:
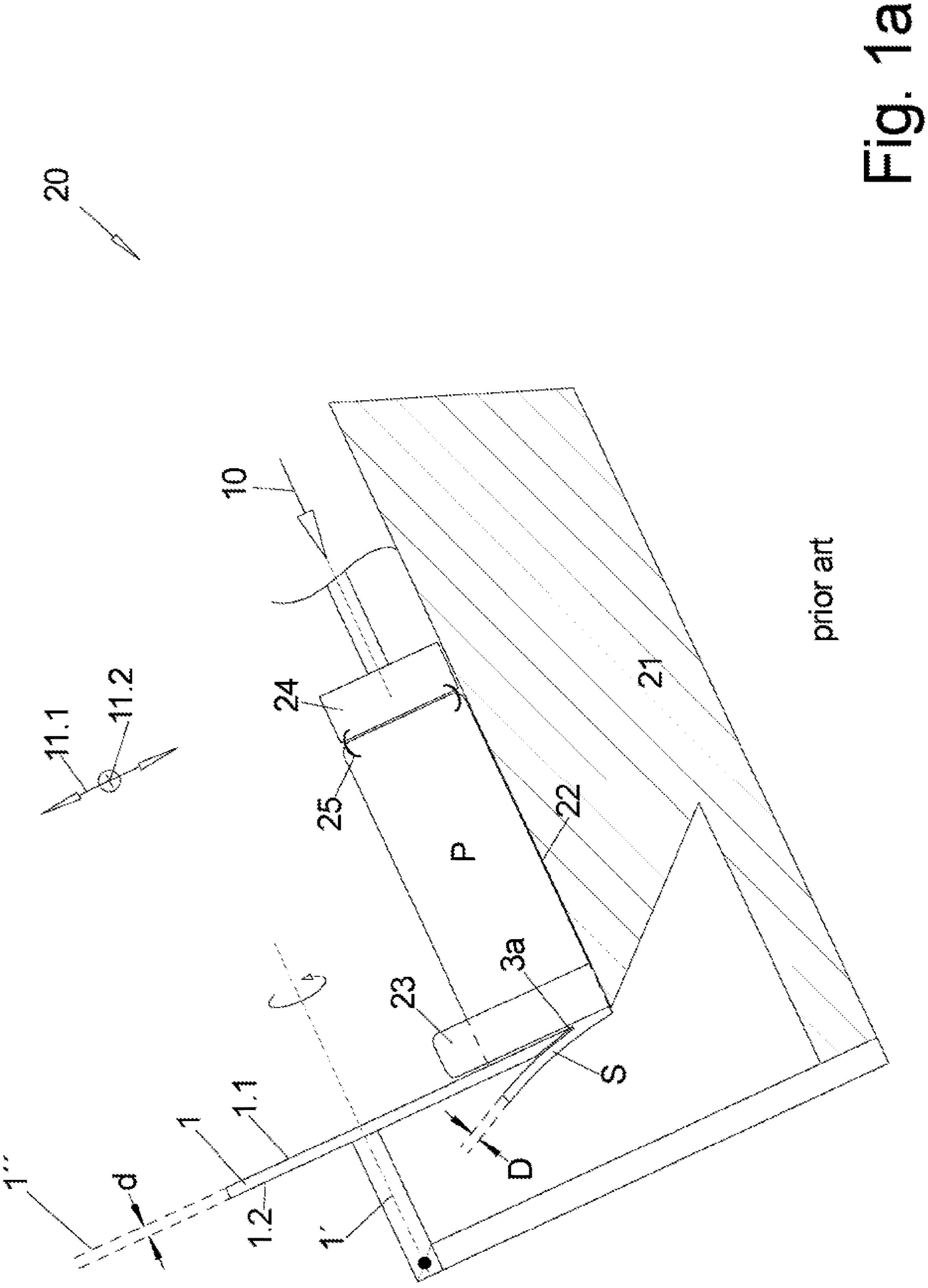
prior art Fig. 1a
FIG. 1*a*: a known slicer in a side view.

FIG. 1*a* shows a conventional slicer 20 as a cutting device for slicing a strand-shaped product P into slices S.

The strand-like product P, the so-called caliber P, rests on a product receipt 22, for example a sliding surface or a roller conveyor, which is usually inclined obliquely downwards towards the blade 1, and is pushed forwards, usually step by step, from the rear end by a pusher 24 contacting there, but is also prevented from sliding forward too quickly by means of holding claws 25.

At the front, lower end of the product receipt 22 there is a so-called cutting frame 23 with at least one product passage through which the front end of caliber P is pushed, whereby several calibers P and product passages in the cutting frame 23 can be located one behind the other in the direction of view of FIG. 1*a*.

The protrusion of caliber P protruding from the cutting frame 23 is cut off by a rotating, sickle-shaped blade 1 along a cutting plane 1" as a slice S with a thickness D, cut off immediately in front of the front face of the cutting frame 23 on the cutting side, which is turned away from the pusher 24, and usually falls onto a conveyor, which is not shown.

Figure 1B:
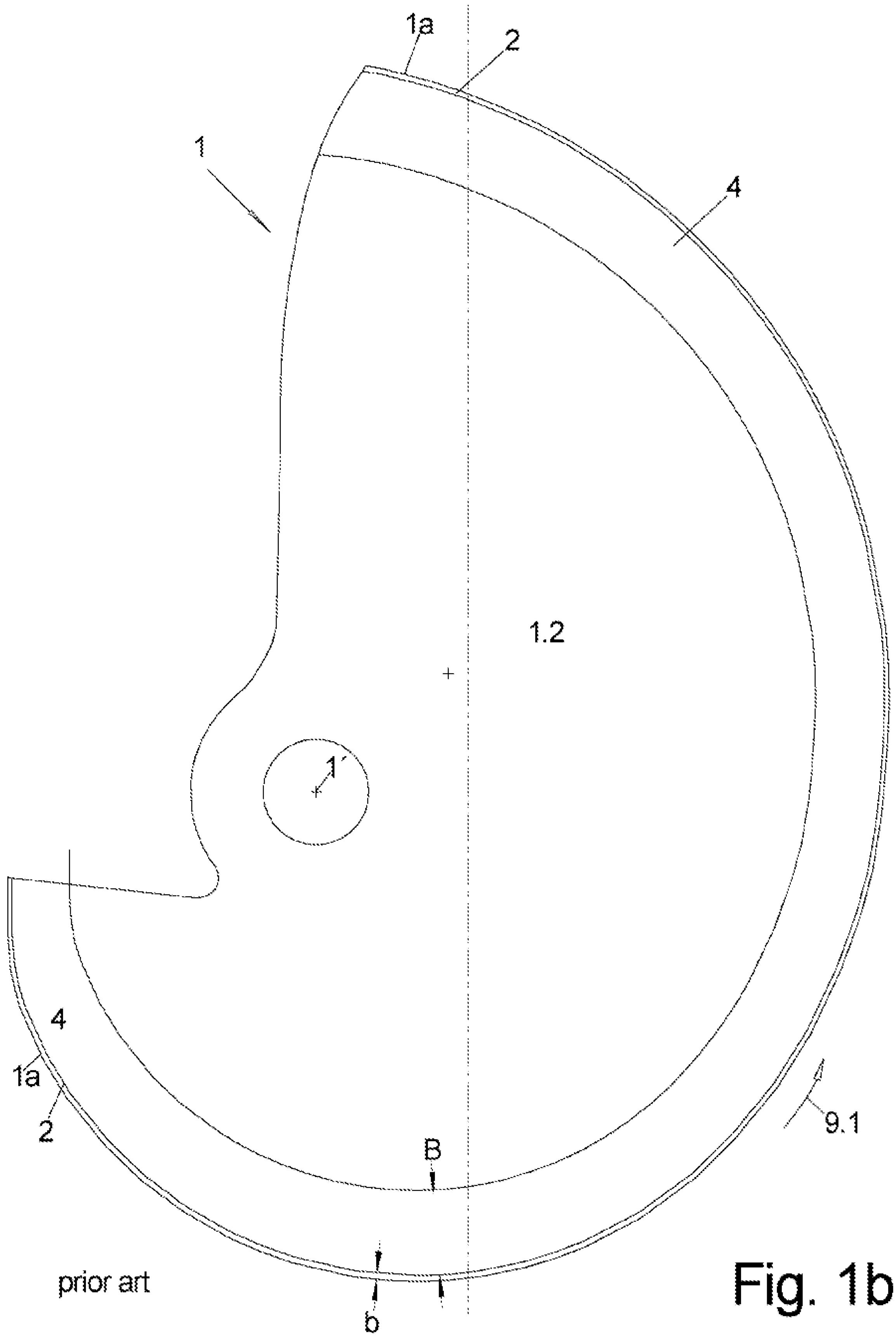
FIG. 1*b, c*: the well-known plate-shaped blade of the slicer in top view and partial cut.
Figure 1C:
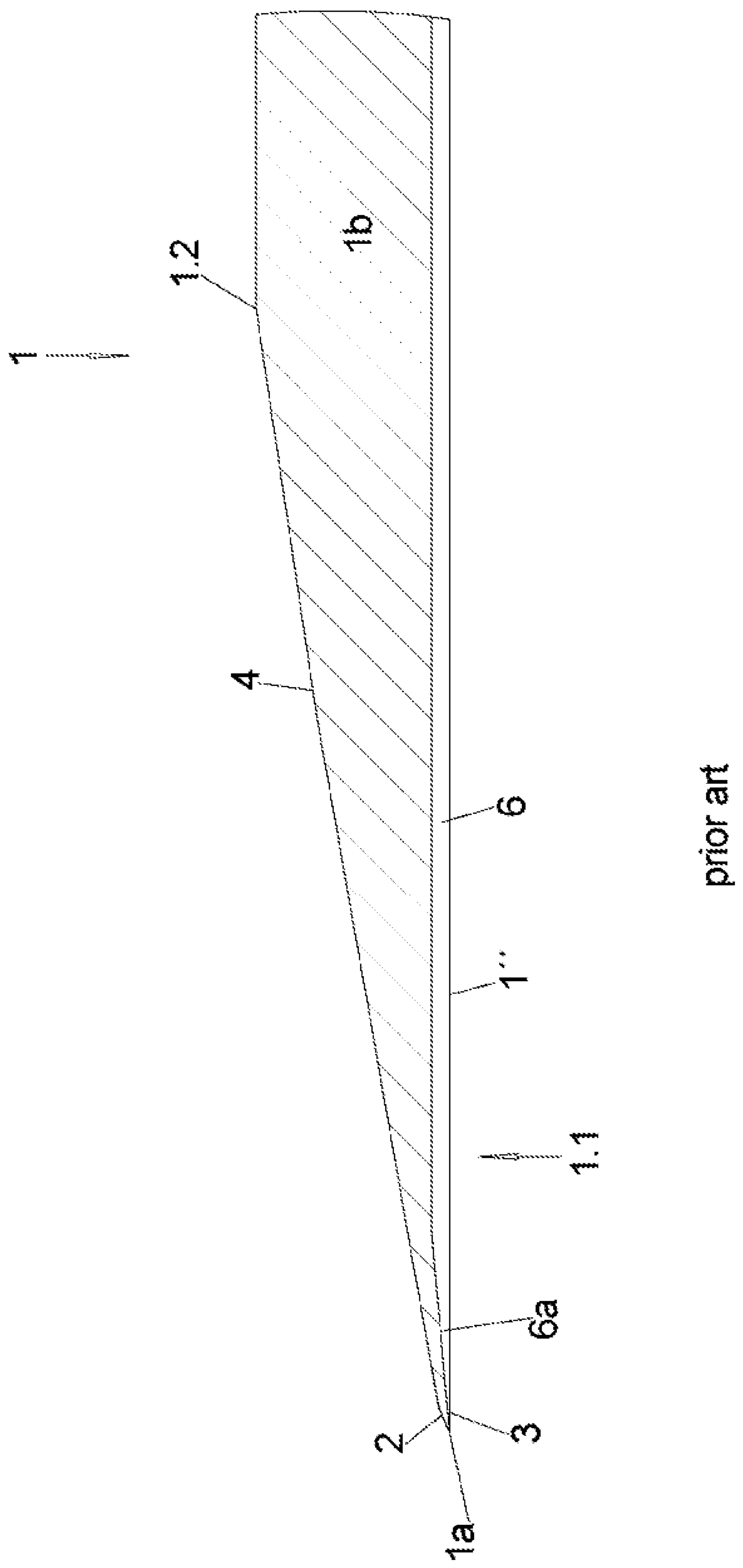

As can be seen more clearly in FIG. 1*c*, the body 1*b* of the plate-shaped blade 1 is tapered in cross-section along its outer circumference, the acute-angled cutting edge 1*a* being formed by the rear cutting surface 2 at the rear side of the blade 1.2 and the front cutting surface 3 at the front side of the blade 1.1.

It can be seen that in the otherwise flat front face of the blade 1.1 there may be a front recess 6, which can reach with its outer flank 6*a* to the cutting edge 1*a*, so that the cutting edge 1*a* can then be formed by the rear cutting face 2 and the outer flank 6*a* of the recess 6.

Only the rear side of the blade 1.2, which in use is bulged towards the slice S to be cut off as shown in FIG. 1*a*, thus bulges beyond the cutting plane 1", but not the blade front side 1.1.

The cutting edge 1*a* running around in one plane defines a cutting plane 1". The rear cutting surface 2 is inclined to the cutting plane 1" at a cutting angle δ. On the side of the rear cutting surface 2 facing away from the cutting edge 1*a*, the pressing surface 4, which is flatter than the cutting surface 2 to the cutting plane 1" at a pressing angle β to the cutting plane 1", adjoins the rear cutting surface 2 and is intended to press the cut-off slice S away from the cutting plane 1".

FIG. 1*b* shows the shape of the blade 1 considered in the direction of the axis of rotation 1', whose cutting edge 1*a* is extending over approximately ¾ of the circumference of the blade continuously increases in one of the two circumferential directions 9, the so-called cutting direction 9.1, in its distance from the axis of rotation 1', thereby causing the blade 1 to penetrate increasingly into the product during rotation about the axis of rotation 1' and to cut through the product completely at a corresponding distance of the axis of rotation 1' from the product passage in the cutting frames 23.

Figure 2:
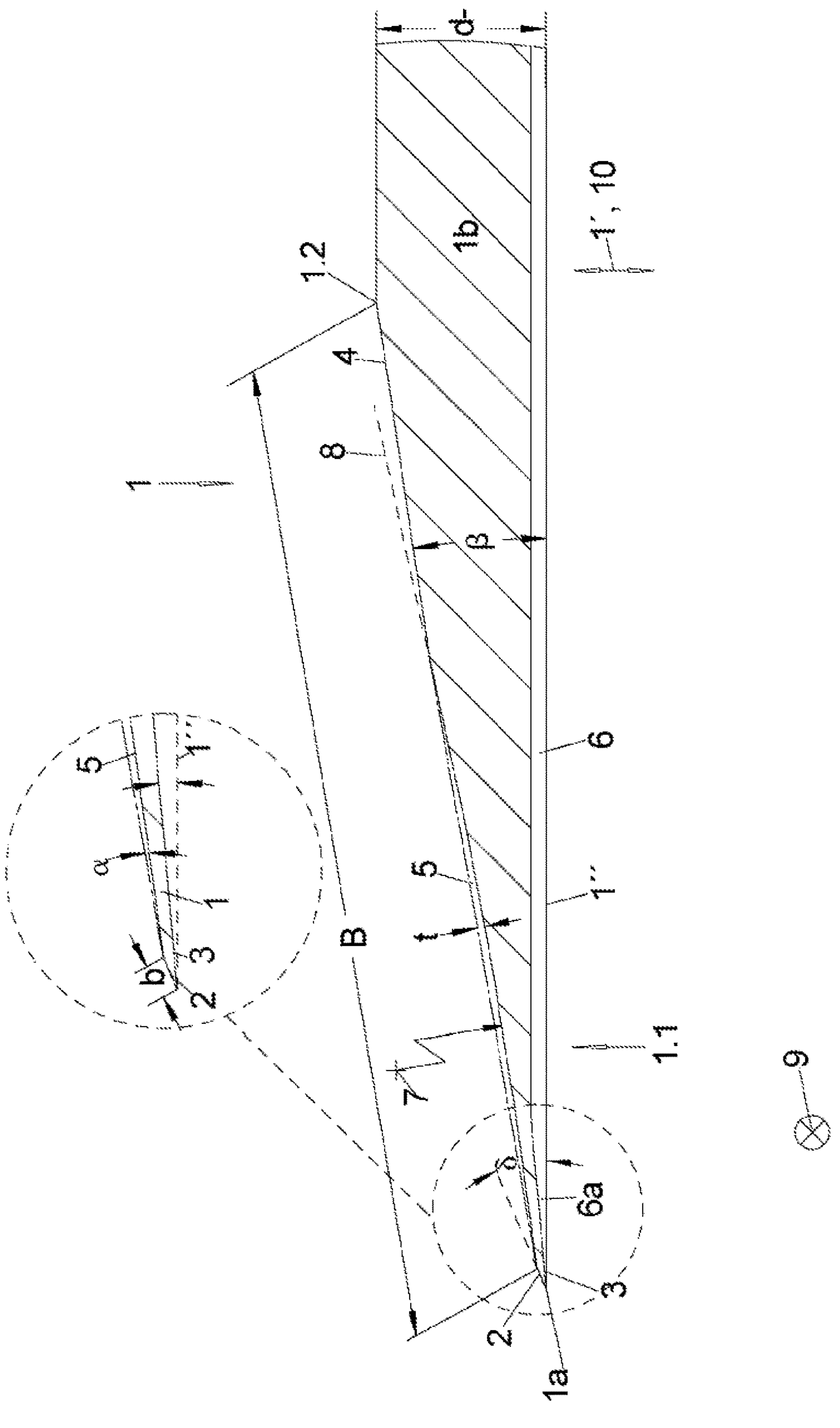
FIG. 2: the blade of the invention in an analogous partial cut according to FIG. 1*c,*

FIG. 2 shows in an analogous representation according to FIG. 1*c* the inventive design of blade 1:

In this case, a recess 5 is arranged in the pressing surface 4, the cross-sectional contour of which—in a section perpendicular to the direction of the cutting edge 1*a*, the viewing direction of FIG. 2—represents a segment of a circle, i.e. the bottom of the recess 5 represents part of an arc of a circle with the centre 7, mainly because recess 5 can then be produced with a round, rotating grinding wheel 8 indicated by dotted lines, the axis of rotation of which preferably runs in the direction shown in FIG. 2, i.e. the direction 9 of the cutting edge 1*a* through the centre 7 of the arc of the recess 5 drawn in FIG. 2.

According to FIG. 2 and FIGS. 3*a-c*, the recess 5 extends to the transition between the pressing surface 4 and the rear cutting surface 2, but could also be located at a distance from it.

At the end facing away from the rear cutting surface 2, the recess 5 does not reach the end of the pressing surface 4, but its extension in this direction is about 60% of the width B of the pressing surface 4 measured in this direction, but is about 10-15 times the width b of the rear cutting surface 2 in this direction.

The clearance angle α, with which the flanks of the recess 5, in particular the flank pointing towards the cutting edge 1*a*, ends into the surrounding pressing surface 4, has a maximum of 3°, better a maximum of 2°, and the transition can also be rounded. This prevents damage to the cutting surface on product P, especially on the slice S.

Figure 3A:
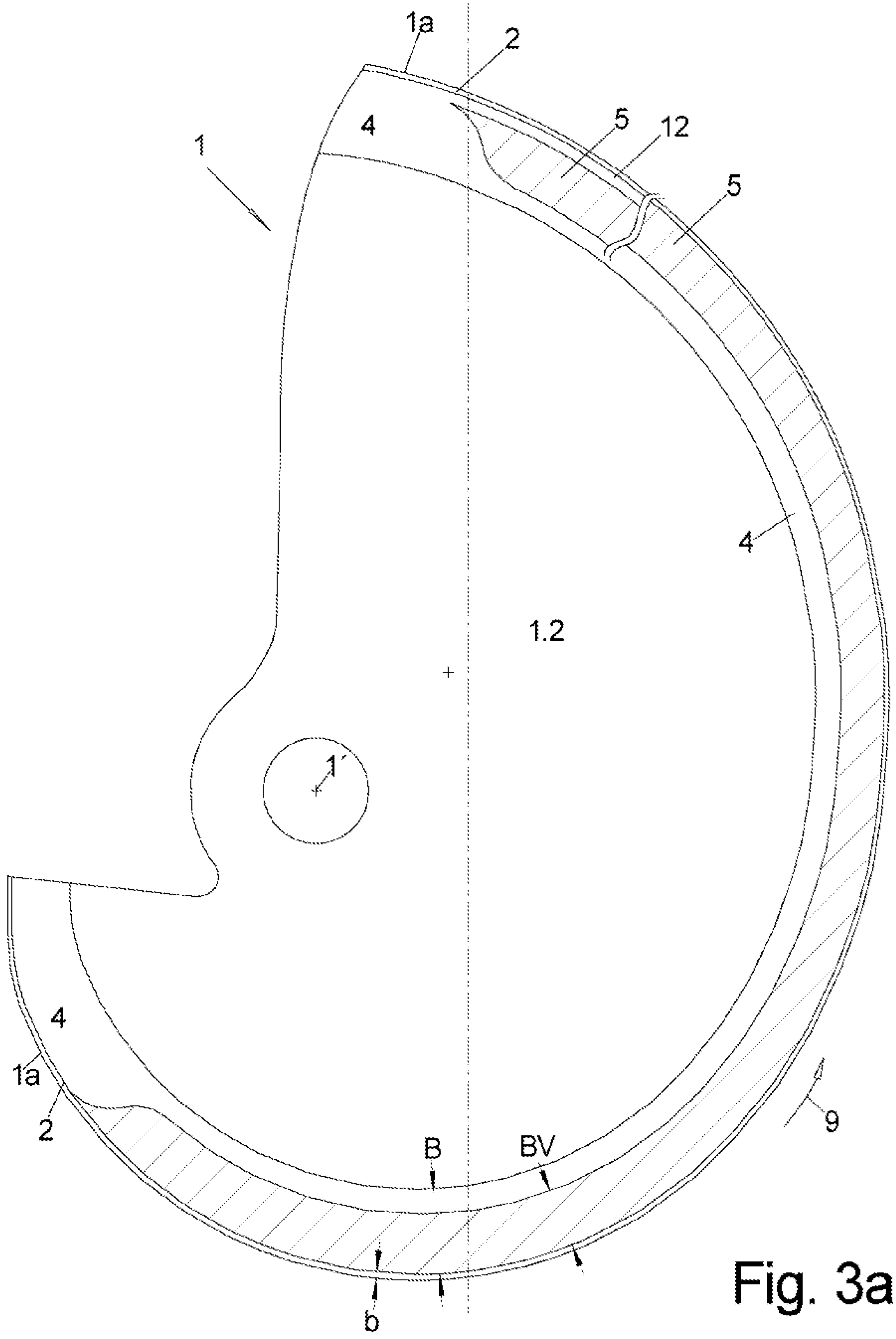
FIGS. 3*a-c*: the blade according to the invention in top view in several versions.
Figure 3B:
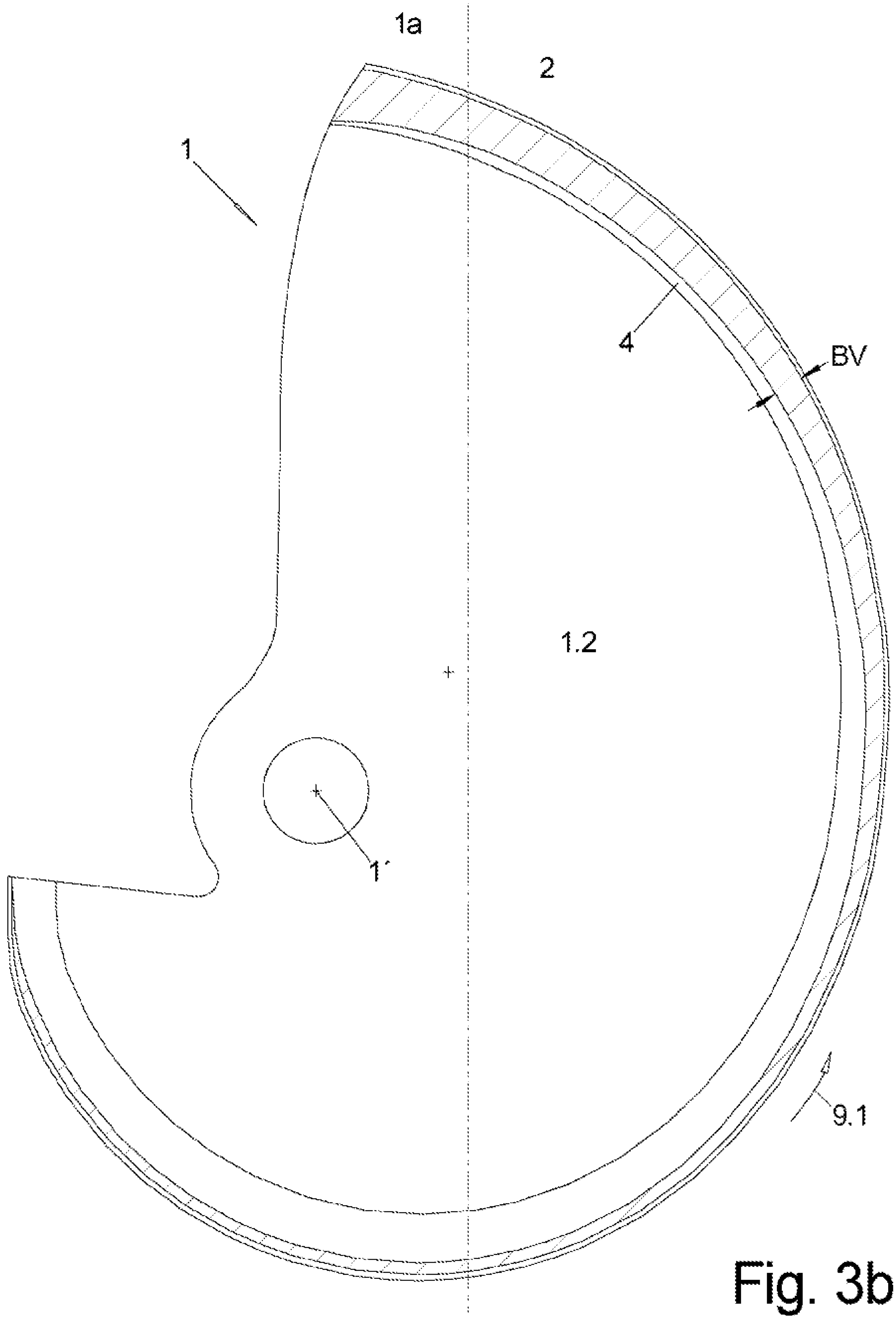
Figure 3C:
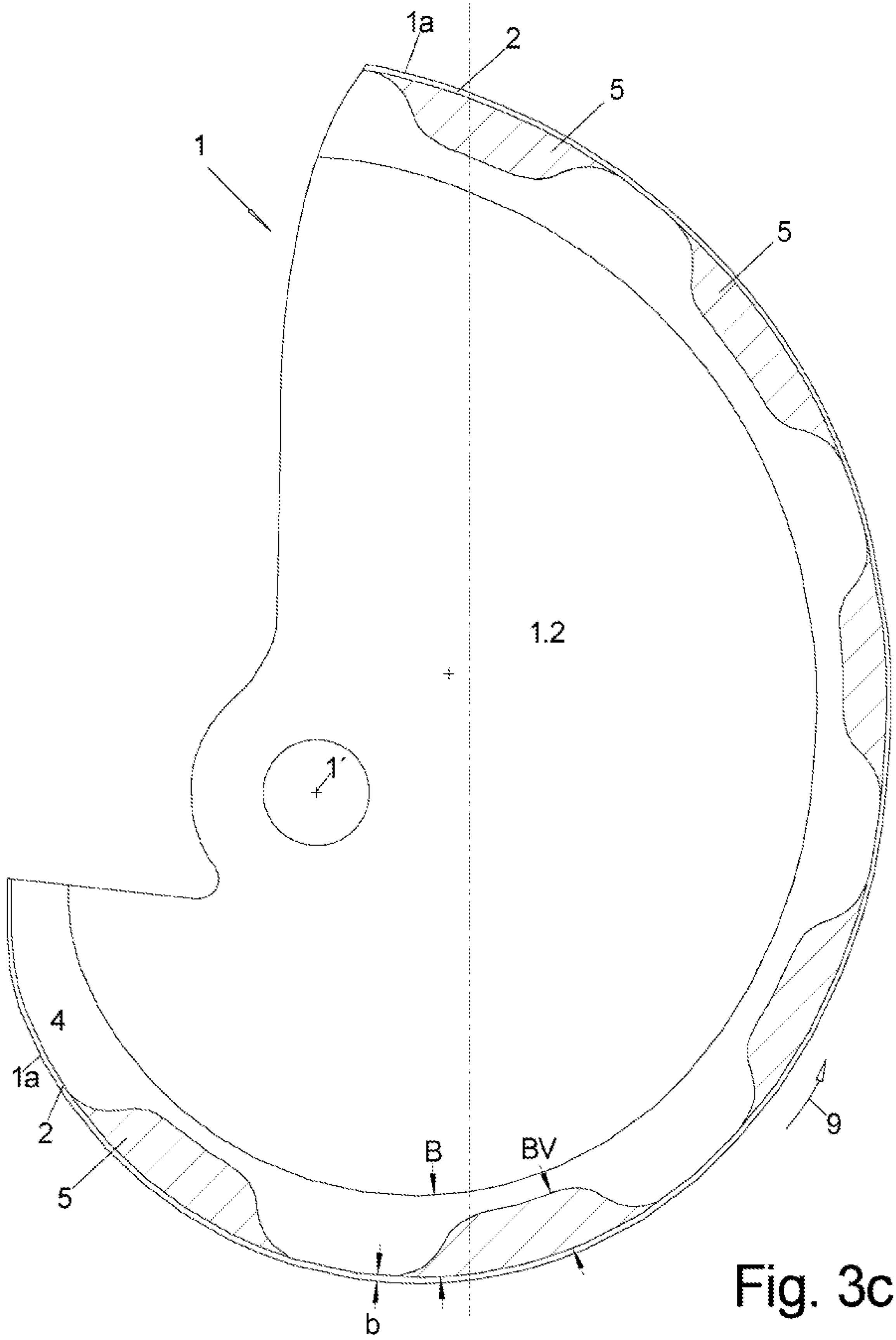

However, the design of the recess 5 when viewed from the back of the blade 1.2, especially along the circumferential direction 9 of blade 1, is different in FIGS. 3*a-c:*

In the design as shown in FIG. 3*a*, the width BV of the recess 5 measured along the pressing surface 4 and perpendicular to the cutting edge 1*a* is constant in the circumferential direction 9, and in particular increases only at the beginning and decreases again at the end, whereby even with increasing or decreasing width BV, the radially outer edge of the recess 5 always runs at the same distance 12 from the cutting edge 1*a*, and in particular reaches up to the transition, usually a kink, between the pressing surface 4 and the rear cutting surface 2 or maintains a distance 12 therefrom, as shown in the upper part of FIG. 3*a*.

The initial and final area of the pressing surface 4 in circumferential direction 9, i.e. about 15% maximum each, better 10% maximum of the extension in circumferential direction 9, preferably shows no recess 5.

In the design as shown in FIG. 3*b*, recess 5 in cutting direction 9.1, i.e. the circumferential direction with increasing distance of the cutting edge 1*a* from the axis of rotation 1', has an increasing width BV, in particular a continuously increasing width BV.

In this design, recess 5 also extends over the entire circumferential length parallel to the cutting edge 1*a*, which is not a requirement for a design with width BV increasing in the circumferential direction.

In the design according to FIG. 3*c*, several recesses 5 are arranged at a distance from each other in circumferential direction 9 one behind the other, which in this case are identically formed, but this is not a requirement for this design with several recesses 5 arranged one behind the other.

In particular, these recesses 5 have a constant width BV measured perpendicular to the cutting edge 1*a* along the pressing surface 4, at least in their central area in the circumferential direction 9, which becomes smaller and smaller at the beginning and end and runs out. With the radially outer edge of the recesses 5 extending continuously parallel to the cutting edge 1*a*, the distance of the radially inner edge of the depressions from the cutting edge 1*a* along the direction of extension of the cutting edge 5 preferably becomes smaller and smaller towards the beginning and end, down to zero.

REFERENCE SIGN LIST

1 Cutting blade, sickle blade
1' Rotation axis, blade axis, centre
1" Cutting plane
1*a* Cutting edge, spiral
1.2 Blade rear side, rear side

2 Rear cutting surface
1.1 blade front side, front side
3 front cutting surface
4 pressing surface
5 recess, groove
5" Cross sectional surface
6 Front side recess
7 centre
8 grinding wheel
9 Circumferential direction, direction of cutting edge
9.1 Cutting direction, peripheral direction
10 axial direction
11.1, 11.2 Cross direction, radial direction
12 Distance
20 Cutting device, slicer
21 Base frame
22 Product receipt
23 Cutting frames
24 Pusher
25 Holding claw
B Width rear cutting surface
BB Width pressing surface
BV Width recess
D Thickness blade
D Thickness slice
P Product, string, caliber
S Slice
t depth of the recess
δ cutting angle
α clearance angle
β pressing angle

The invention claimed is:

1. A blade for machines for cutting elastic products into slices, the blade comprising:
a plate-shaped base body having a rotation axis, a rear cutting surface, which forms a part of a blade rear side of the plate-shaped base body, and a front cutting surface, which forms a part of a blade front side, wherein the rear cutting surface and the front cutting surface meet in a continuous cutting edge, wherein
the blade rear side extends axially outwards from a cutting plane, defined by the cutting edge on a front side of the plate-shaped base body,
the rear cutting surface is inclined relative to the cutting plane at a cutting angle,
the rear cutting surface is positioned adjacent to a pressing surface, wherein a portion of the pressing surface extends on the blade rear side at a pressing angle relative to the cutting plane which is smaller than the cutting angle,
at least one recess is formed only in the pressing surface on the blade rear side, with a radially outer end of the at least one recess terminating distant from the cutting edge, and a radially inner end of the at least one recess terminating radially outward from a radially inner end of the pressing surface,
wherein a size and/or a shape of a cross-sectional surface of the at least one recess transverse to the cutting plane varies in a direction in which the cutting edge extends, wherein a position of the at least one recess relative to the cutting edge varies in the direction in which the cutting edge extends, and
the at least one recess extends only along a part of a length of the cutting edge, or the cutting edge is a finite cutting edge and the at least one recess ends at a distance before a beginning and/or before an end of the cutting edge.

2. The blade according to claim 1, wherein the at least one recess comprises a groove extending primarily in the direction of the cutting edge.

3. The blade according to claim 1, wherein the at least one recess extends in the direction of the cutting edge at most to a beginning of the rear cutting surface.

4. The blade according to claim 1, wherein
either in case that the least one recess extends only along a part of the length of the cutting edge, the cutting edge forms an endless cutting edge,
or in case that the cutting blade is a sickle blade, the cutting edge is a finite cutting edge deviating from a circular shape, wherein a distance of the finite cutting edge from a centre, which is also located in the cutting plane, increases continuously in a direction of extension of the finite cutting edge.

5. The blade according to claim 1, wherein the size, shape and radial position of the cross-sectional surface of the at least one recess is constant along the direction of the cutting edge.

6. The blade according to claim 1, wherein
a cross section of the at least one recess changes continuously in terms of size and/or shape along the direction of the cutting edge.

7. The blade according to claim 1, wherein
the at least one recess comprises several recesses arranged one behind the other in the direction of the cutting edge.

8. The blade according to claim 1, wherein
a thickness of the body of the blade is a maximum of 15 mm, and/or
a maximum depth of the at least one recess is not more than 2 mm.

9. The blade according to claim 1, wherein a depth of the at least one recess is at most 20% of a thickness of the blade at an end of the pressing surface facing away from the cutting edge.

10. The blade according to claim 1, wherein
a clearance angle between a flank of the at least one recess and the pressing surface changes along the direction of the cutting edge.

11. The blade according to claim 1, wherein
the at least one recess reaches the rear cutting surface at least over a part of an extension of the at least one recess as viewed from above on the pressing surface.

12. The blade according to claim 1, wherein a width of the at least one recess in the pressing surface measured perpendicular to the cutting edge is at least 30% of a width of the pressing surface.

13. A cutting device for automatically cutting strand-shaped elastic products into slices, the cutting device comprising:
a base frame,
a product receipt attached to the base frame, and
the blade according to claim 1 mounted so as to be rotatable about an axis of rotation, the blade being arranged with the rear side facing away from the product receipt.

14. The cutting device according to claim 13, wherein
the cutting edge, which deviates from a circular shape, lies in the cutting plane which extends perpendicular to the axis of rotation, and
a distance of the cutting edge from the axis of rotation in a circumferential direction increases continuously.

15. A method of using the cutting blade according to claim 1 in a slicer, wherein speed of the cutting blade in use
is at least 500 rpm, and/or
is not more than 3000 rpm.

16. The blade according to claim 6, wherein radial width of the at least one recess continuously increases along the direction of the cutting edge.

17. The blade according to claim 7, wherein all the recesses of that at least one recess are either of identical design or are continuously varied in size and/or shape and/or radial position in the direction of the cutting edge.

18. The blade according to claim 10, wherein the clearance angle increases or decreases continuously in one direction.

19. The blade according to claim 12, wherein the width of the at least one recess is at least 50% of the width of the pressing surface.

20. A blade for a machine for cutting products into slices, the blade comprising:

a plate-shaped base body having a rotation axis, a rear cutting surface on a blade rear side of the plate-shaped base body, and a front cutting surface on a blade front side of the plate-shaped base body, wherein the rear cutting surface and the front cutting surface meet in a continuous cutting edge, wherein the cutting edge defines a cutting plane that extends in a direction transverse to a rotational axis of the plate-shaped base body, the rear cutting surface is inclined relative to the cutting plane at a cutting angle, the rear cutting surface is positioned adjacent to a pressing surface, wherein a portion of the pressing surface extends on the blade rear side at a pressing angle relative to the cutting plane which is smaller than the cutting angle, at least one recess is formed only in the pressing surface on the blade rear side, with a radially outer end of the at least one recess terminating distant from the cutting edge, and a radially inner end of the at least one recess terminating radially outward from a radially inner end of the pressing surface, wherein a size and/or a shape of a cross-sectional surface of the at least one recess transverse to the cutting plane varies in a direction in which the cutting edge extends, a position of the at least one recess relative to the cutting edge varies in the direction in which the cutting edge extends, and the at least one recess extends only along a part of a length of the cutting edge.

21. The blade according to claim 20, wherein a cross section of the at least one recess changes continuously in terms of size and/or shape along the direction in which the cutting edge extends.

* * * * *